United States Patent
Guichard et al.

(10) Patent No.: US 10,616,106 B2
(45) Date of Patent: Apr. 7, 2020

(54) ESTABLISHING VIRTUAL NETWORK ROUTES IN A COMPUTER NETWORK

(71) Applicant: FUTUREWEI TECHNOLOGIES, INC., Santa Clara, CA (US)

(72) Inventors: James Guichard, Hollis, NM (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/832,984

(22) Filed: Dec. 6, 2017

(65) Prior Publication Data

US 2019/0173784 A1 Jun. 6, 2019

(51) Int. Cl.
| | |
|---|---|
| H04L 12/741 | (2013.01) |
| H04L 12/931 | (2013.01) |
| H04L 12/725 | (2013.01) |
| H04L 12/715 | (2013.01) |
| H04L 12/723 | (2013.01) |

(52) U.S. Cl.
CPC ............ H04L 45/74 (2013.01); H04L 45/302 (2013.01); H04L 45/64 (2013.01); H04L 49/70 (2013.01); H04L 45/50 (2013.01)

(58) Field of Classification Search
CPC ......... H04L 45/50; H04L 45/74; H04L 49/70; H04L 12/00; H04L 12/46; H04L 12/721; H04L 12/723; H04L 12/725; H04L 12/861; H04L 12/935; H04L 12/947; H04L 12/741; H04L 12/931; H04L 45/64; H04L 45/302
See application file for complete search history.

(56) References Cited

U.S. PATENT DOCUMENTS

| | | | |
|---|---|---|---|
| 9,559,946 B2 * | 1/2017 | Arumugam | ........... H04L 45/245 |
| 9,634,936 B2 * | 4/2017 | Bansal | ..................... H04L 45/30 |
| 9,699,116 B2 * | 7/2017 | Zhang | ..................... H04L 49/35 |

(Continued)

FOREIGN PATENT DOCUMENTS

| | | | |
|---|---|---|---|
| CN | 106936681 A | 7/2017 | |
| CN | 107181663 | * 9/2017 | ............. H04L 12/46 |

(Continued)

OTHER PUBLICATIONS

International Search Report and Written Opinion issued in International Application No. PCT/CN2018/119259 dated Feb. 27, 2019, 9 pages.

*Primary Examiner* — Tri H Phan
(74) *Attorney, Agent, or Firm* — Fish & Richardson P.C.

(57) ABSTRACT

A computer-implemented method for establishing virtual network (VN) routes includes receiving, at a Software Defined Networking (SDN) controller and from a customer network, a first routing request. The first routing request includes a destination address for a VN and a first Quality of Service (QoS) indicator associated with a first service of the VN. The SDN controller determines a first VN route in a provider network based on the first QoS indicator and the destination address. The SDN controller associates a first VN label with the first VN route. The SDN controller transmits a first routing response to the customer network. The first routing response includes the first VN label. The SDN controller transmits the first VN label and first routing information indicating the first VN route to an edge router of the provider network.

18 Claims, 9 Drawing Sheets

(56) References Cited

U.S. PATENT DOCUMENTS

| | | | |
|---|---|---|---|
| 9,729,424 B2* | 8/2017 | Yin | H04L 45/02 |
| 10,148,556 B2* | 12/2018 | Arumugam | H04L 45/245 |
| 10,148,561 B2* | 12/2018 | Cui | H04L 45/302 |
| 10,200,253 B2* | 2/2019 | Lee | H04L 41/12 |
| 2014/0112150 A1* | 4/2014 | Ko | H04L 47/24 |
| | | | 370/236 |
| 2015/0200844 A1* | 7/2015 | Zhu | H04L 45/507 |
| | | | 370/392 |
| 2018/0131570 A1* | 5/2018 | Lee | H04L 12/4633 |
| 2018/0159766 A1* | 6/2018 | Cui | H04L 45/302 |
| 2018/0337862 A1* | 11/2018 | Sharma | H04L 47/2441 |

FOREIGN PATENT DOCUMENTS

| | | |
|---|---|---|
| CN | 107181663 A | 9/2017 |
| WO | 2014044689 A1 | 3/2014 |
| WO | 2015167489 A1 | 11/2015 |
| WO | 2017121247 A1 | 7/2017 |

* cited by examiner

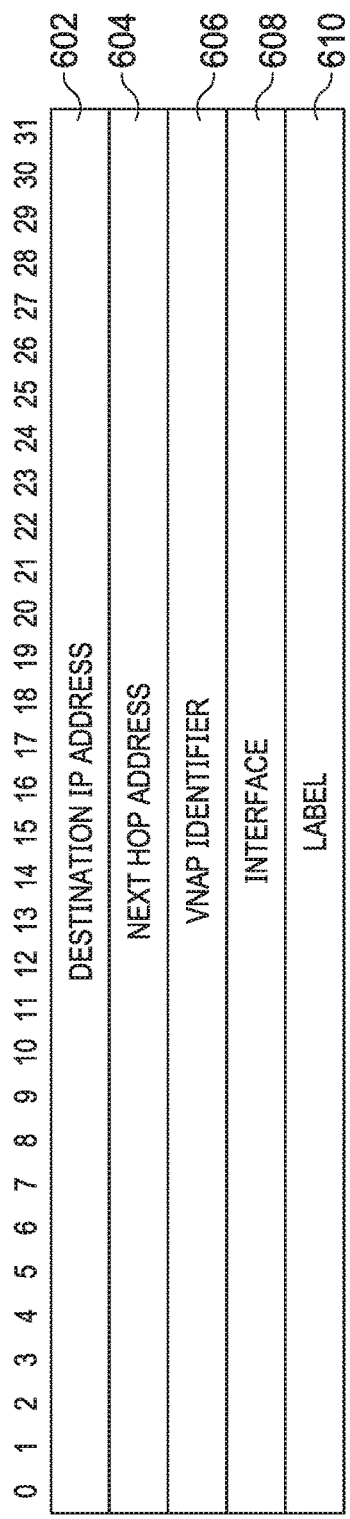

```
<Common Header> is defined in [RFC5440]

<PCE-initiated-lsp-list> ::= <PCE-initiated-lsp-request>
  [<PCE-initiated-lsp-list>]

<PCE-initiated-lsp-request> ::= (<PCE-initiated-lsp-
  instantiation>| <PCE-initiated-lsp-deletion>)

<PCE-initiated-lsp-instantiation> ::= <SRP>
                                      <LSP>
                                      [<END-POINTS>]
                                      <ERO>
                                      [<attribute-list>]
                              502 —  <Forwarding Rule>
```

FIG. 5

| 602 | DESTINATION IP ADDRESS |
| 604 | NEXT HOP ADDRESS |
| 606 | VNAP IDENTIFIER |
| 608 | INTERFACE |
| 610 | LABEL |

FIG. 6

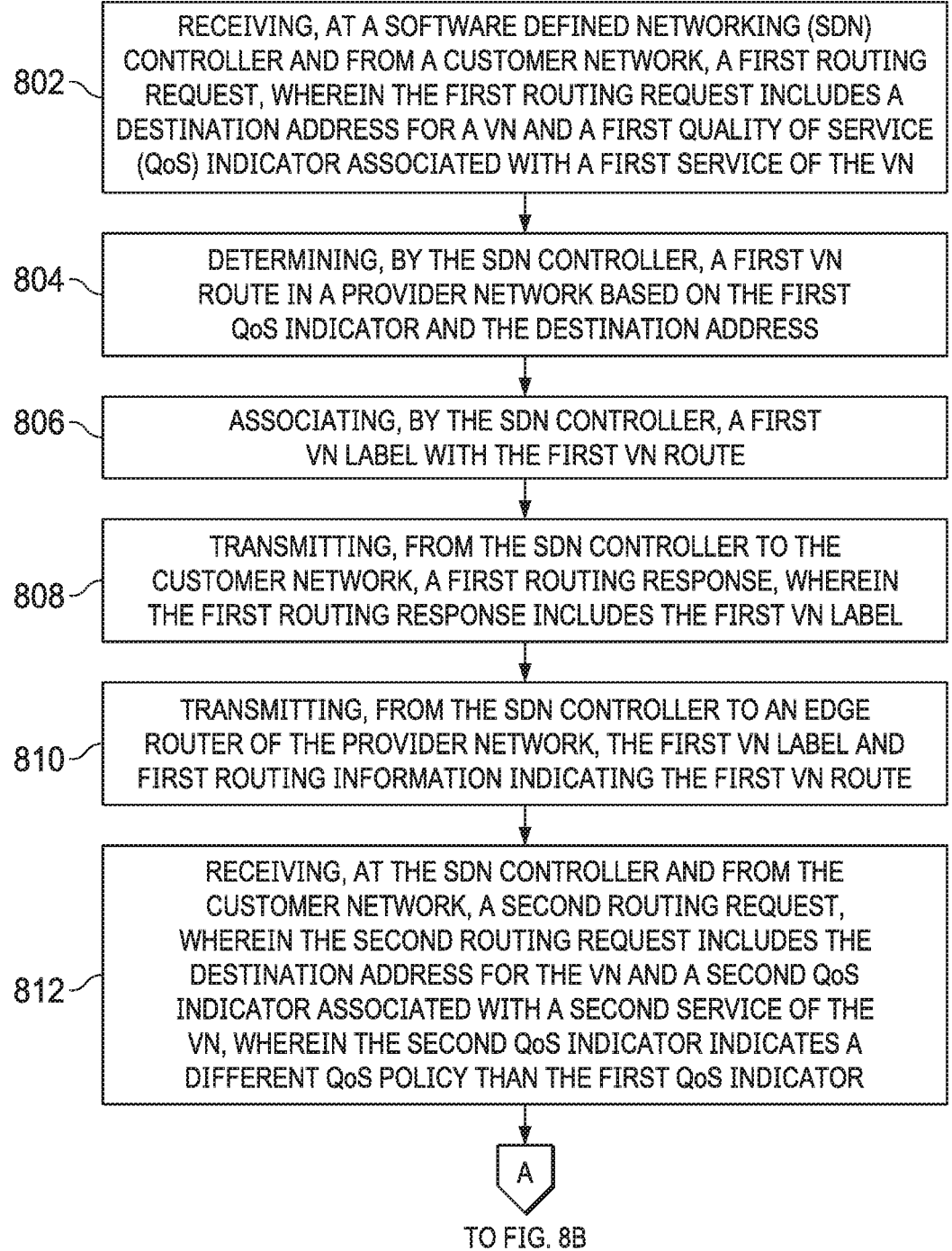

ESTABLISHING VIRTUAL NETWORK ROUTES IN A COMPUTER NETWORK

TECHNICAL FIELD

This disclosure relates to establishing virtual network routes in a computer network.

BACKGROUND

In the context of network computing, network virtualization can be implemented to combine computing networks, hardware and software network resources and network functionality into a single, software-based administrative entity. A service provider can use network virtualization to provide one or more Virtual Networks (VNs) to its customers. Each VN provides network services for transmitting data packets between a source node and a destination node in the customer's network. Examples of network services can include connectivity, encryption, data storage and manipulations, and application-level services. The VN can be implemented using computing resources in the service provider's network, including for example, one or more computing nodes. By using network virtualization, these computing resources can be shared among different VNs. In some cases, a VN can be a Virtual Private Network (VPN), which provides security functions over the VN. The VPN can be implemented using secure tunnels that are protected by encryptions, authentications, or a combination thereof.

SUMMARY

The present disclosure describes establishing a virtual network route in a computer network.

In a first implementation, a computer-implemented method for establishing a virtual network route includes: for establishing virtual network (VN) routes includes: receiving, at a Software Defined Networking (SDN) controller and from a customer network, a first routing request, where the first routing request includes a destination address for a VN and a first Quality of Service (QoS) indicator associated with a first service of the VN; determining, by the SDN controller, a first VN route in a provider network based on the first QoS indicator and the destination address; associating, by the SDN controller, a first VN label with the first VN route; transmitting, from the SDN controller to the customer network, a first routing response, wherein the first routing response includes the first VN label; and transmitting, from the SDN controller to an edge router of the provider network, the first VN label and first routing information indicating the first VN route.

In a second implementation, a computer-implemented method for routing data packets according to different virtual network (VN) routes includes: receiving, at an edge router of a provider network and from a Software Defined Networking (SDN) controller, a first VN label and first routing information indicating a first VN route; receiving, at the edge router and from a customer network, a first data packet, wherein the first data packet includes a first meta data field, and the first meta data field indicates that the first data packet is associated with the first VN label; and routing the first data packet according to the first VN route.

In a third implementation, a Software Defined Networking (SDN) controller includes: a non-transitory memory storage comprising instructions; and one or more hardware processors in communication with the memory storage, wherein the one or more hardware processors execute the instructions to: receive, from a customer network, a first routing request, wherein the first routing request includes a destination address for a virtual network (VN) and a first Quality of Service (QoS) indicator associated with a first service of the VN; determine a first VN route in a provider network based on the first QoS indicator and the destination address; associate a first VN label with the first VN route; transmit, to the customer network, a first routing response, wherein the first routing response includes the first VN label; and transmit, from the SDN controller to an edge router of the provider network, the first VN label and first routing information indicating the first VN route.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 5 illustrates pseudo codes of an example PCInitiate message, according to an implementation.

FIG. 6 illustrates an example forwarding rule object, according to an implementation.

Like reference numbers and designations in the various drawings indicate like elements.

DETAILED DESCRIPTION

Figure 1:
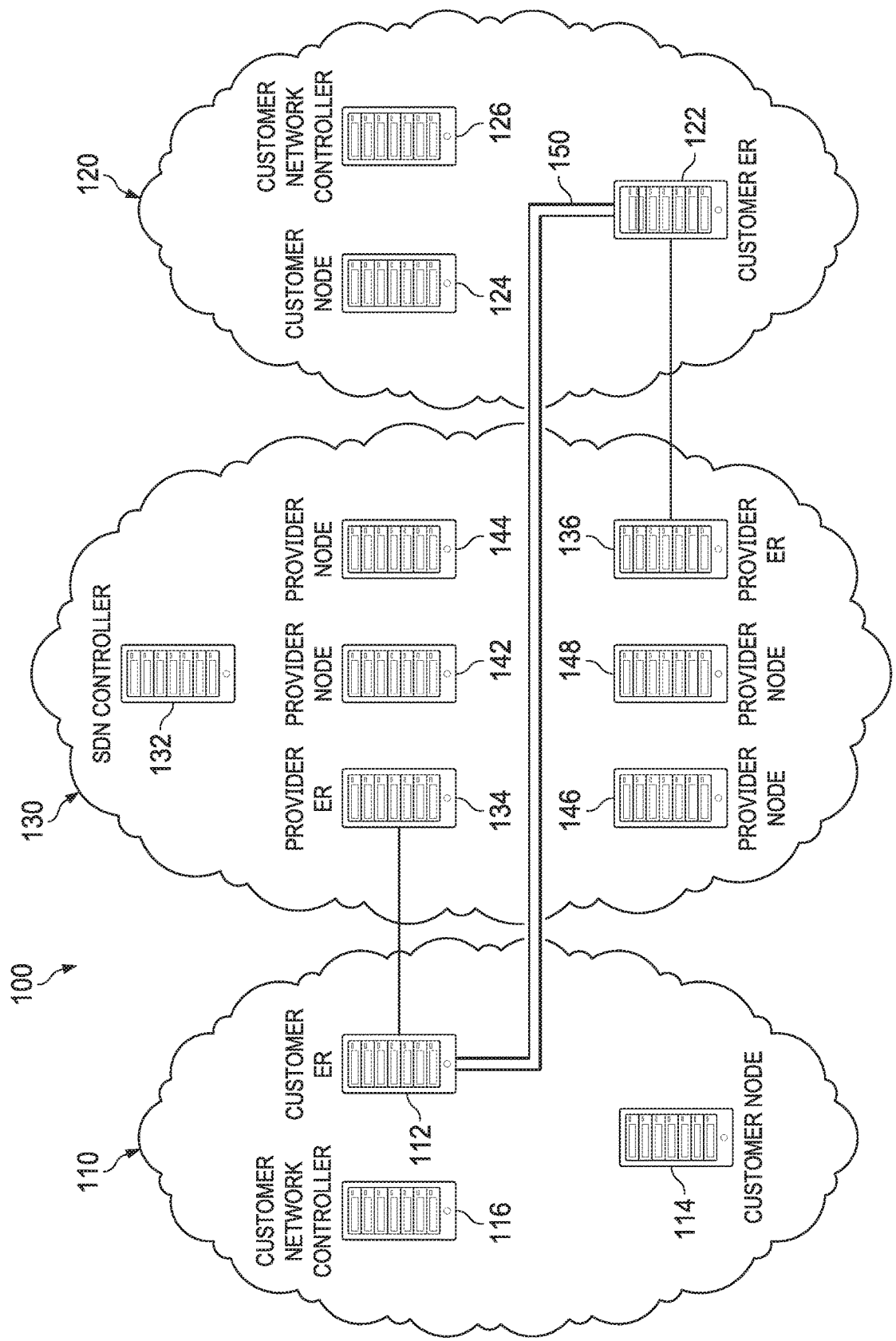
FIG. 1 is an example communication system that transmits data packets over a virtual network (VN), according to an implementation.

The following detailed description describes establishing a virtual network route in a computer network and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In some cases, a VN service can be provided by a provider network. The provider network can be owned, operated, or both owned and operated by service providers, such as telecommunications companies, data carriers, wireless communication providers, Internet service providers, or cable television operators. The provider network can provision a data transport route in the provider network to route data packets for the VN. The data transport route can be referred to as a VN route or a VN path. In some cases, the VN can be used to provide a VPN connection, and the VN route or the VN path can also be referred to as a VPN route or a VPN path. The VN route can be associated with the endpoints of the VN. In some cases, the provider network can be implemented using Multiprotocol Label Switching (MPLS) protocols. In these or other cases, the VN route can be a Label Switched Path (LSP) that is instantiated by the provider network upon a request for establishing a VN.

In some cases, a customer for the provider network may provision different services for the VN. For example, an enterprise may provide a real-time video conference application and an email application for the enterprise employees. Both the real-time video conference application and the email application may use the same endpoints of the VN, but they may be associated with different Quality of Service (QoS) policies. For example, the real-time video conference application may require high bandwidth and low latency, while the email application may require medium bandwidth without a latency constraint. Because the endpoints of the VN are the same for both applications, the provider network may use the same VN route to transport data packets of these different applications, and thus may not be able to satisfy these different QoS policies.

In some implementations, different services or applications can be differentiated using VN labels. The provider network can receive a VN routing request indicating the QoS policy of a service associated with a VN. The provider network can determine a VN route that meets the QoS policy and associate the VN label with the VN route. The VN label can be included in a meta data field of the data packet. Upon receiving the data packet, the provider network can parse the meta data field, identify the VN label, and route the data packet using the VN route that is associated with the VN label. This approach provides service differentiation capabilities for the same VN, and therefore enables the provider network to efficiently allocate resources to meet different QoS policies of the same VN. FIGS. 1-11 and associated descriptions provide additional details of these implementations.

FIG. 1 is an example communication system 100 that transmits data packets over a VN, according to an implementation. The example communication system 100 includes a provider network 130 that provides a VN 150 to customer networks 110 and 120.

A customer network, e.g., the customer network 110 or 120, represents a communication network of a customer requesting VN services. The customer can include one or more individuals, one or more groups of individuals, one or more enterprises, or any other entities that request VN services. A customer network can include one or more customer nodes, e.g., customer nodes 114 and 124, as illustrated. A customer node represents a network node that creates, receives, or transmits data packets in the customer network. Examples of the customer node can include a modem, hub, bridge, switch, and Data Terminal Equipment (DTE), such as a digital telephone handset, a printer, or a host computer.

Each customer network can include a Customer Network Controller (CNC), e.g., CNC 116 or CNC 126. A CNC is a server that provides network controlling functions for a customer network. Examples of the network controlling functions can include authentication, discovery, network configuration, providing application programming interfaces, and other network services. In some implementations, the CNC can interface with a provider network to request a VN. The VN can provide two or more services, each of the two or more services can have different QoS policies. FIGS. 2-11 and associated descriptions provide additional details of these implementations.

Each customer network can also include one or more customer edge routers (ERs), e.g., the customer ERs 112 and 122. An edge router, also referred to as an access router, is a network router located at the boundary of a network that connects to external networks, for example, wide area networks, the Internet, or other networks. In some implementations, the customer ERs can be endpoints of a VN. In the illustrated example, the customer ER 112 is the source of the VN 150 and the customer ER 122 is destination of the VN 150.

The provider network 130 represents a communication network of a service provider that provides VN services. Service providers include any entity that provides or supports communications of either voice, video, audio or data content and include, among others, telecommunications companies, data carriers, wireless communication providers, Internet service providers, cable television operators, etc. The provider network 130 includes one or more provider nodes, e.g., provider nodes 142, 144, 146, 148 as illustrated. A provider node represents a network node in the provider network 130 that transmits data packets. Examples of the provider node can include a modem, hub, bridge, switch, and DTE. The provider network 130 includes a Software-Defined Networking (SDN) controller 132. The SDN controller 132 represents a server that determines data transport paths in the provider network 130. In some implementations, the SDN controller 132 can have access to topology information of the provider network 130. The SDN controller 132 can use the topology information for patch computations. In some implementations, the SDN controller 132 can build a Topology Database (TED) using underlying routing protocols. Examples of the routing protocols can include Open Shortest Path First (OSPF), Intermediate System to Intermediate System (IS-IS), and Border Gateway Protocol (BGP). Based on the TED, the SDN controller 132 can calculate Type, Length, Value (TLV) capabilities for nodes and paths between adjacent nodes, and determine a route that meets the QoS policy. In some cases, the SDN controller 132 can continue to monitor the traffic conditions in the provider network 130, re-compute, and update routes according to the current traffic conditions. In some cases, the SDN controller 132 can be a Multi-Domain Service Coordinator (MDSC) for a multi-domain provider network, or a Provisioning Network Controller (PNC) for a single-domain provider network.

The provider network 130 also includes one or more provider edge routers (ERs), e.g., the provider ERs 134 and 136, that connect the provider network 130 to external networks, e.g., the customer network 110 and 120. In some implementations, the provider ER can store routing information received for the SDN controller 132 and route data packets according to the routing information.

The provider network 130 provides the VN 150 to the customer networks 110 and 120 for network services. A VN, for example the VN 150, represents hardware and software network resources that can be combined to provide network services. In the illustrated example, the VN 150 provides data transport between the customer ER 112 in the customer network 110 and the customer ER 122 in the customer network 120. The VN 150 can be implemented using one or more provider ERs 134-136 and one or more provider nodes 142-148. In some cases, as discussed in the following examples, the same VN 150 can be implemented using more than one VN routes that use different provider nodes.

In an example operation, the SDN controller 132 can receive a first routing request from the CNC 116. The first routing request can include endpoint address information for establishing the VN 150, and a first QoS indicator indicating the QoS policy of a first service provided by the VN 150. The SDN controller 132 can determine a first VN route based on the first QoS indicator and the endpoint address information. The first VN route can include the provider nodes 142 and 144. The SDN controller 132 can associate a first VN label with the first VN route. The SDN controller 132 can transmit a first routing response to the CNC 116. The first routing response can include the first VN label. The SDN controller 132 can transmit the first VN label and first routing information indicating the first route to the provider ER 134. The provider ER 134 can associatively store the first VN label and first routing information.

Similarly, the SDN controller 132 can receive a second routing request from the CNC 116. The second routing request can include endpoint address information that is the same as the first routing request, and a second QoS indicator indicating a different QoS policy of a second service provided by the VN 150. The SDN controller 132 can determine a second VN route based on the second QoS indicator and the endpoint address information. The second VN route can include the provider nodes 146 and 148. The SDN controller 132 can associate a second VN label with the second VN route. The SDN controller 132 can transmit a second routing response to the CNC 116. The second routing response can include the second VN label. The SDN controller 132 can transmit the second VN label and second routing information indicating the second route to the provider ER 134. The provider ER 134 can associatively store the second VN label and second routing information.

The provider ER 134 can receive a data packet from the customer ER 112. The data packet can include a meta data field. The meta data field can include a VN label indicating the service associated with the data packet. The provider ER 134 can parse the meta data field and extract the VN label. If the VN label is the first VN label, the provider ER 134 transmits the data packet using the first VN route, including the provider nodes 142 and 144. If the VN label is the second VN label, the provider ER 134 transmits the data packet using the second VN route, including the provider nodes 146 and 148. FIGS. 2-11 and associated descriptions provide additional details to these implementations.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 2:
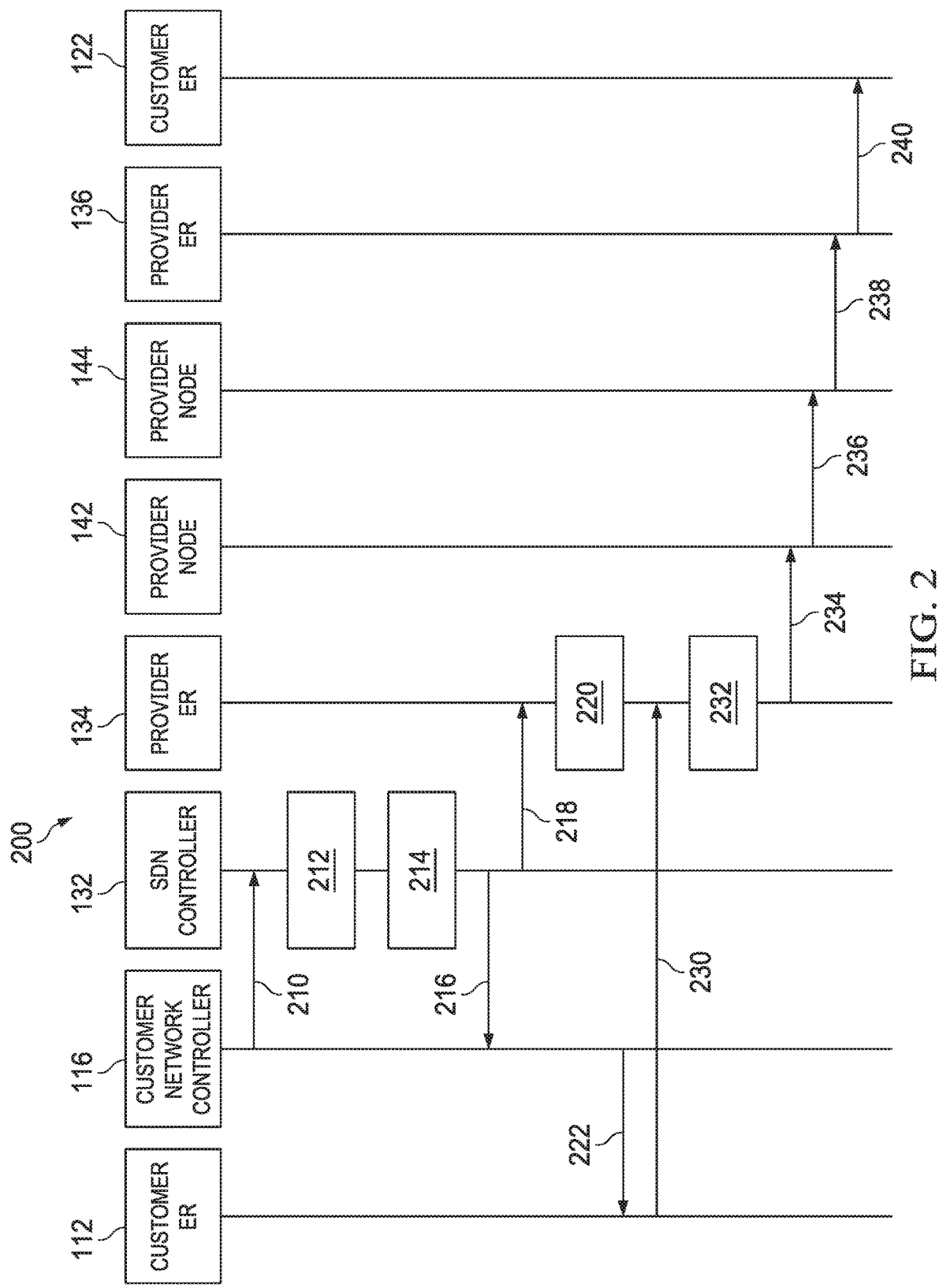
FIG. 2 is a flow diagram illustrating an example process for establishing VN routes, according to an implementation.

FIG. 2 is a flow diagram illustrating an example process 200 for establishing VN routes, according to an implementation. For clarity of presentation, the description that follows generally describes process 200 in the context of the other figures in this description. In the illustrated example, the process 200 is performed by the customer ERs 112 and 122, the CNC 116 in the customer network, the provider nodes 142 and 144, the provider ERs 134 and 136, and the SDN controller 132 in the provider network. However, it will be understood that process 200 may be performed, for example, by any suitable system, environment, software, and hardware, or a combination of systems, environments, software, and hardware, as appropriate. In some implementations, various steps of process 200 can be run in parallel, in combination, in loops, or in any order.

The process begins at 210, where the CNC 116 transmits a first routing request to the SDN controller 132 for establishing a first VN route for a first service. In some implementations, the first routing request can include address information corresponding to a VN. For example, the first routing request can include a destination address, e.g., the Internet Protocol (IP) address for the customer ER 122, a source address, e.g., the IP address for the customer ER 112, or a combination thereof. In some cases, the source address and the destination address pair can be used to represent the VN in a provider network. In some cases, one address, e.g., the destination address, can be used to represent the VN in a provider network.

The first routing request can also include a first QoS indicator. The first QoS indicator can indicate the QoS for a first service. The QoS indicator can include bandwidth, latency, error rate, or other QoS policies for the first service. In one example, the first QoS indicator can indicate a bandwidth policy of 10 gigabytes per second (GBps) and a delay policy of less than 10 milliseconds (ms). In another example, the first QoS indicator can indicate a bandwidth policy of five GBps bandwidth with no delay policies. By including the first QoS indicator in the first routing request, the CNC 116 requests the SDN controller 132 to set up a VN route in the provider network that can satisfy the QoS policy for the first service. The first QoS indicator can be formatted according to a standardized protocol, e.g., Network Configuration Protocol (NETCONF), RestConf Protocol, or Path Computation Elements Protocol (PCEP). Alternatively, the first QoS indicator can be formatted according to a proprietary protocol that is used by the provider network and the customer network.

At 212, the SDN controller 132 determines a first VN route in the provider network. The first VN route is determined based on the address information included in the first routing request. For example, the SDN controller 132 can select a VN route that can route data packets from the customer ER 112, as indicated by the source address, to the customer ER 122, as indicated by the destination address.

The first VN route is also determined based on the first QoS indicator included in the first routing request. The SDN controller 132 can select provider nodes in the provider network that can route the data packet according to the service policy indicated by the first QoS indicator. In some implementations, the SDN controller 132 can select these provider nodes based on the traffic condition in the provider network, the processing speed of each provider node, and a combination thereof. Examples of the traffic condition can include the current processing load of the provider nodes and the current transmission rate of the links between adjacent provider nodes. For example, the SDN controller 132 can select one or more candidate provider nodes, calculate the expected processing latency at each candidate provider node, calculate the expected transmission latency for each link between adjacent candidate provider nodes, calculate the expected latency by adding the expected transmission latencies and the expected processing latencies, and determine whether the selected candidate provider nodes can form a VN route that satisfies the latency policy indicated by the first QoS indicator. If the latency policy is met, the selected candidate provider nodes can be included in the first VN route. Otherwise, the SDN controller 132 can select other provider nodes as candidate nodes and repeat the calculation. In the illustrated example, the first VN route includes the provider nodes 142 and 144.

At 214, the SDN controller 132 associates a first VN label with a first VN route. The first VN label is an indicator that can be used by the customer network to indicate that a data packet is to be routed for the first service. In one example, the first VN label can be "VNAP 1.A," which represents service A for VN 1.

At 216, in response to the first routing request, the SDN controller 132 transmits a first routing response to the CNC 116. The first routing response includes the first VN label.

At 218, the SDN controller 132 transmits the first VN label and first routing information to the provider ER 134. The first routing information indicates the first VN route determined by the SDN controller 132 at 212. In some implementations, the first routing information can include the address of each hop on the first VN route. For example, the first routing information can include, in order, the IP addresses of the provider ER 134, the provider node 142, the provider node 144, and the provider ER 136.

At 220, the provider ER 134 stores the first routing information in association with the first VN label.

At 222, the CNC 116 transmits the first VN label to the customer ER 112. The customer ER 112 can associate the first VN label with the first service.

Figure 3:
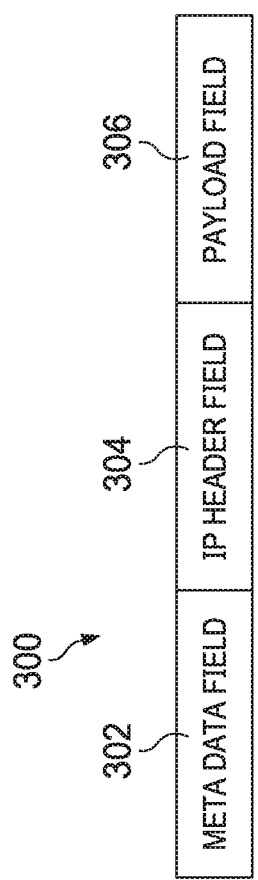
FIG. 3 is a schematic diagram illustrating an example format of the first data packet, according to an implementation.

At 230, the customer ER 112 transmits a first data packet to the provider ER 134. The first data packet includes the first VN label, which indicates that the first data packet is for the first service. In some cases, the first VN label can be included in a meta data field. FIG. 3 is a schematic diagram 300 illustrating an example format of the first data packet, according to an implementation. As shown in FIG. 3, the first data packet includes a Meta Data Field 302, an IP Header Field 304, and a Payload Field 306. The IP Header Field 304 can include header information of the first data packet, e.g., the IP version and the source and destination IP address. The payload field 306 can include the data payload of the first data packet. The Meta Data Field 302 can include the first VN label.

Figure 4:
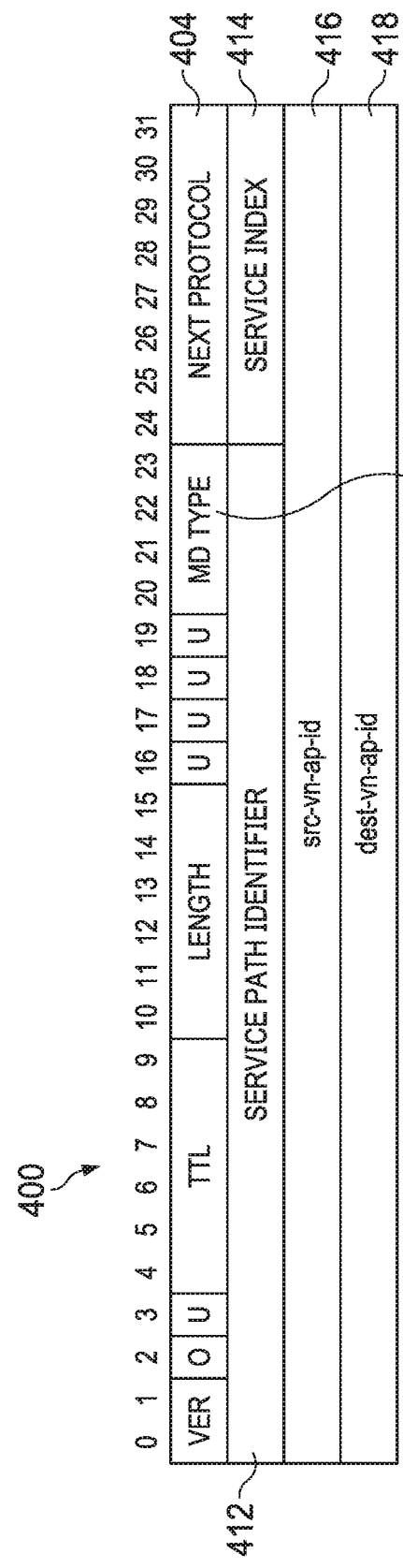
FIG. 4 is a schematic diagram illustrating an example format of the Network Service Header (NSH), according to an implementation.

In some implementations, the first meta data field can be a Network Service Header (NSH) defined according to Internet Engineering Task Force (IETF) protocols. FIG. 4 is a schematic diagram 400 illustrating an example format of the NSH, according to an implementation. As illustrated, the NSH includes 16 bytes. The first four bytes include a meta data (MD) Type field 402 and a Next Protocol field 404. The MD Type field 402 indicates the type of meta data to be carried. In the illustrated example, the MD Type field 402 can be set to type 2. The Next Protocol field 404 indicates the protocol type of the first data packet. In the illustrated example, the Next Protocol field 404 can be set to MPLS or segment routing.

The second four bytes include a Service Path Identifier field 412 and a Service Index field 414. These fields indicate service path information for the first data packet. In some cases, these fields can be set to configured numbers to indicate that the NSH is used to carry VN labels. For example, the Service Path Identifier field 412 can be set to 100, and the Service Index field 414 can be set to 255. These fields can be set to other combinations of configured values.

The next eight bytes include the first VN label. In some cases, the first VN label can include an src-VN-ap-id 416 and a dest-VN-ap-id 418. The src-VN-ap-id 416 can be set to a VN access point (VNAP) that corresponds to the source address of the VN and the first service. For example, the src-VN-ap-id 416 can be set to "customer ER 112 address.A". The dest-VN-ap-id 418 can be set to a VN access point (VNAP) that corresponds to the destination address of the VN and the first service. For example, the src-VN-ap-id 416 can be set to "customer ER 122 address.A".

Returning to FIG. 2, at 232, the provider ER 134 extracts the first VN label included in the first data packet. The provider ER 134 determines the VN route for the first data packet based on the first VN label. In some implementations, the provider ER 134 can look up the stored VN labels and associated route information and find the first route information that is associated with the first VN label.

In some implementations, the provider ER 134 can modify the first data packet by removing the first meta data field, e.g., the NSH, and adding an MPLS header. The modification can also be referred to as a pop and push operation, where the first meta data field is popped from the first data packet and the MPLS header is pushed on the first data packet. The MPLS header indicates the first VN route. For example, the MPLS header can include, in order, the IP addresses of the provider ER 134, the provider node 142, the provider node 144, and the provider ER 136.

At 234, the provider ER 134 routes the first data packet according to the first VN route. As illustrated, the provider ER 134 transmits the first data packet to the provider node 142, which is the next hop in the first VN route. At 236, the provider node 142 transmits the first data packet to the provider node 144, which is the next hop in the first VN route. At 238, the provider node 142 transmits the first data packet to the provider ER 136, which is the next hop in the first VN route. At 240, the provider ER 136 transmits the first data packet to the customer ER 122, which is the destination of the VN. In some cases, the provider ER 136 can remove the MPLS header from the first data packet before transmitting the first data packet to the customer ER 122.

Part or all of the process 200 can be used for the transmission of other data packets for the first service. Part or all of the process 200 can also be used for the transmission of data packets for a different service. For example, the CNC 116 can transmit a second routing request to the SDN controller 132. The second routing request can include the same address information as the first routing request, and a second QoS indicator that is different than the first QoS indicator, and therefore indicate that the second routing request is for a different service in the same VN. The SDN controller 132 can determine a second VN route that meets the QoS policy indicated by the second QoS indicator. The SDN controller 132 can associate a second VN label with the second VN route. The SDN controller 132 can transmit the second VN label to the customer ER 112 in a second routing response. The SDN controller 132 can also transmit the second VN label and second routing information indicating the second VN route to the provider ER 134. Accordingly, the customer ER 112 can transmit a second data packet including the second VN label, and the provider ER 134 can route the second data packet based on the second VN route.

In some cases, traffic conditions in the provider network can change. For example, the provider node 142 can be overloaded, or the link between the provider nodes 142 and 144 can be congested. The SDN controller 132 can monitor the traffic conditions in the provider network and detect the changes of the traffic conditions. Such monitoring can be periodic, event-triggered, or a combination thereof. If the traffic condition changes, the SDN controller 132 can recalculate the QoS condition of the first route and determine whether the first VN route continues to satisfy the QoS policies set by the first QoS indicator. If the SDN controller 132 determines that the first VN route no longer satisfies the QoS policies, the SDN controller 132 can determine a different VN route that would satisfy the QoS policies. The SDN controller 132 can transmit routing information of the different VN route and the first VN label to the provider ER 134. The provider ER 134 can update its lookup table to associate the first VN label with the routing information of the different VN route, and route data packets based on the different VN route afterwards.

The signaling messages in FIG. 2, e.g., the first routing request and the first routing response, can be formatted according to MPLS protocols or other standardized protocols. Alternatively or in combination, the signaling messages can be formatted according to a proprietary protocol used by the provider network and the customer network.

In some cases, signaling messages between the SDN controller 132 and other nodes in the provider network, e.g., the provider ER 134, can be implemented according to the Path Computation Elements Protocol (PCEP). For example, the first routing information and the first VN label can be transmitted in a PCInitiate message. FIG. 5 illustrates pseudo codes of an example PCInitiate message 500, according to an implementation. As illustrated, the example PCInitiate message 500 includes a forwarding rule object 502 that can be used to indicate the first routing information and the first VN label.

FIG. 6 illustrates the forwarding rule object 502, according to an implementation. The forwarding rule object 502 includes a Destination IP Address field 602, a Next Hop Address field 604, a VNAP Identifier field 606, an Interface field 608, and a Label field 610. The Destination IP Address field 602 indicates the destination address of the first VN route, e.g., the address of the customer ER 122. The Next Hop Address field 604 indicates the address of the next hop in the first VN route. In some cases, the Next Hop Address field can be set to be the address of the next hope in the route, e.g., the provider node 142. The VNAP Identifier field 606 indicates an identifier (ID) of the VN. The Interface field 608 indicates the interface identifier over which the payload is routed. The Label field 610 indicates the first VN label.

Figure 7:
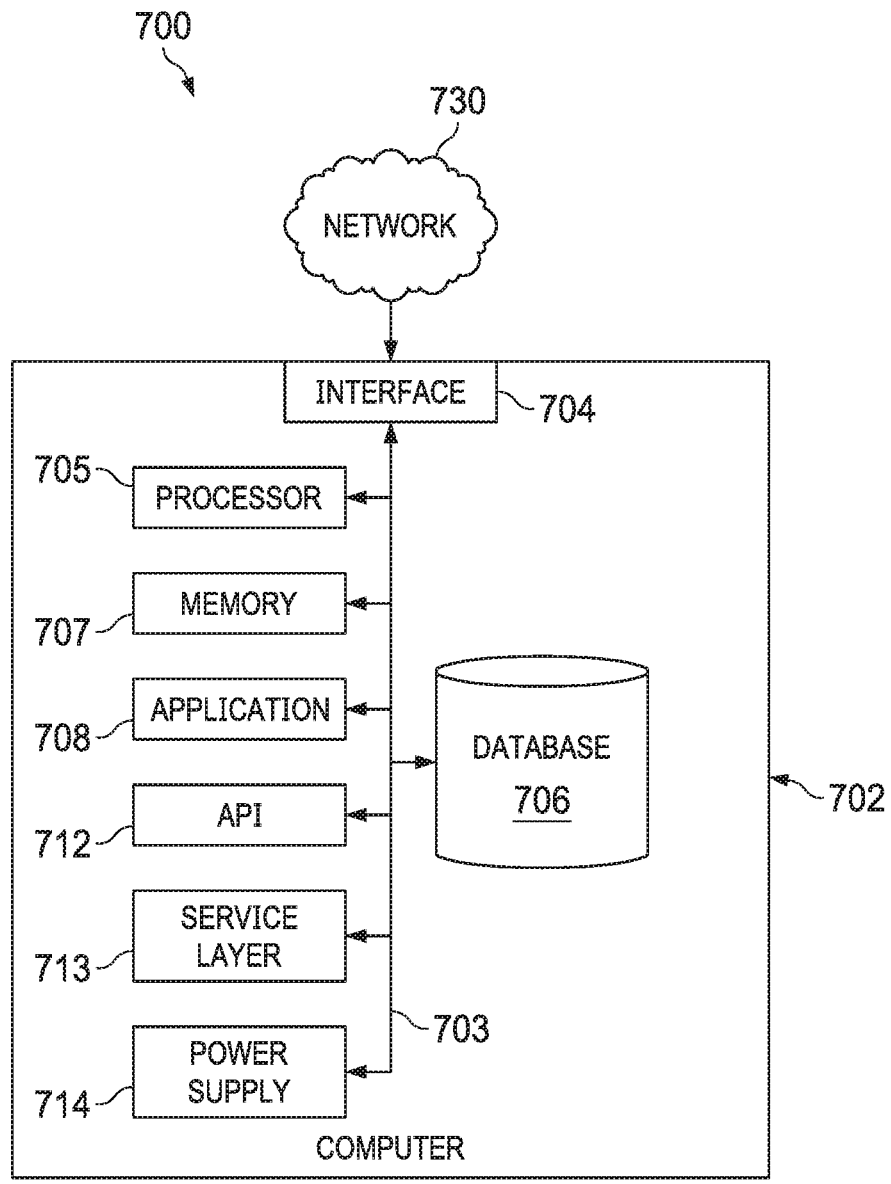
FIG. 7 is a block diagram of an example computer system used to provide computational functionalities associated with described algorithms, methods, functions, processes, flows, and procedures, as described in the instant disclosure, according to an implementation.

FIG. 7 is a block diagram of an example computer system 700 used to provide computational functionalities associated with described algorithms, methods, functions, processes, flows, and procedures, as described in the instant disclosure, according to an implementation. The computer system 700, or more than one computer system 700, can be used to implement the computing nodes described previously in this disclosure, e.g., the SDN controller, the CNC, the edge routers, the provider nodes, and the customer nodes.

The illustrated computer 702 is intended to encompass any computing device, such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include, or be communicably coupled with, an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable formats. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 includes logic encoded in software or hardware (or a combination of software and hardware) and is operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be Random Access Memory (RAM), Read-Only Memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or a combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Figure 8B:
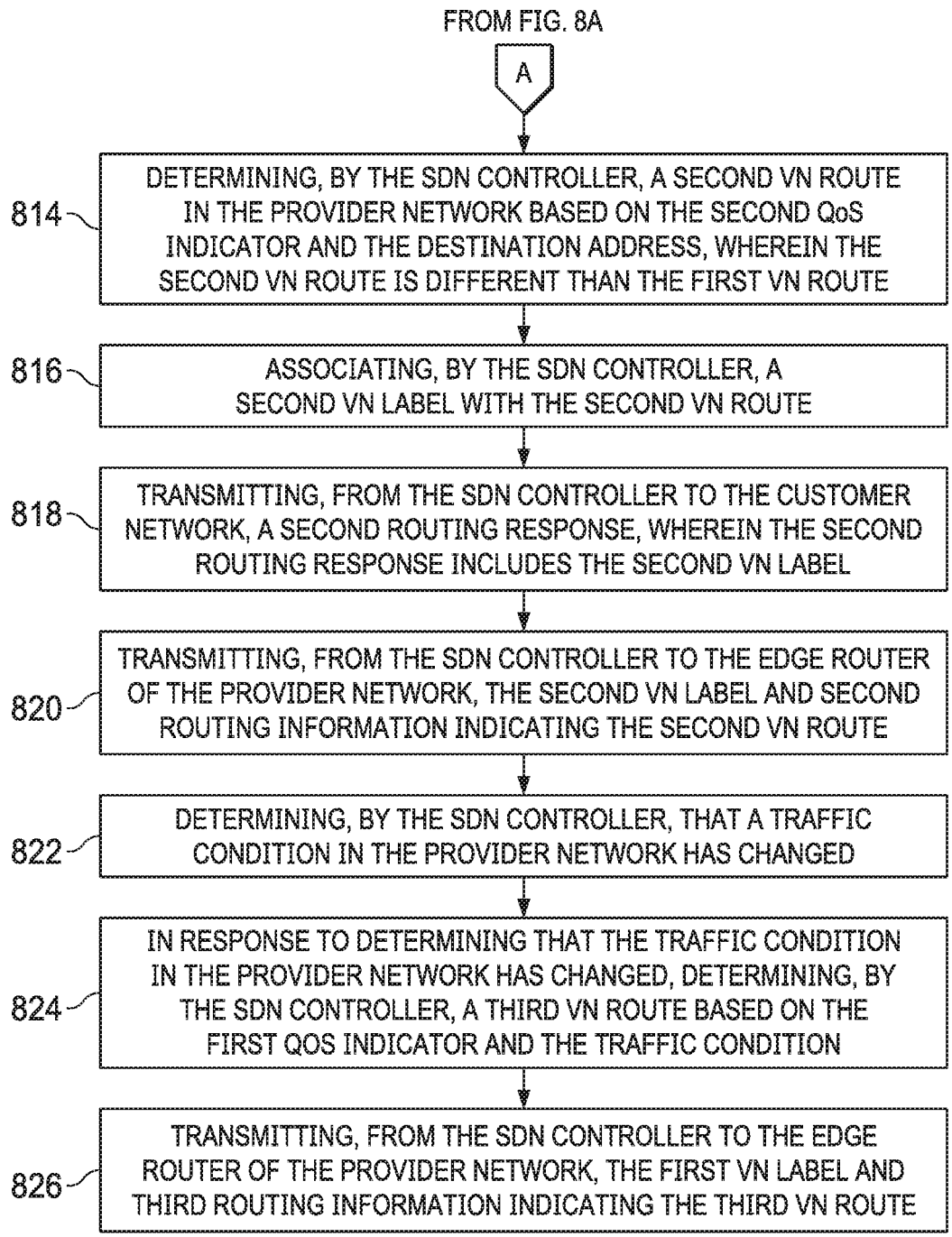
FIG. 8 (including FIGS. 8A and 8B) is a flowchart illustrating an example method for establishing VN routes, according to an implementation.

FIG. 8 (including FIGS. 8A and 8B) is a flowchart illustrating an example method 800 for establishing VN routes, according to an implementation. The method 800 can be implemented by an SDC controller, e.g., the SDN controller 132 shown in FIGS. 1 and 2. The method 800 can also be implemented using additional, fewer, or different entities. Furthermore, the method 800 can also be implemented using additional, fewer, or different operations, which can be performed in the order shown or in a different order. In some instances, an operation or a group of operations can be iterated or repeated, for example, for a specified number of iterations or until a terminating condition is reached.

The example method 800 begins at 802, where an SDN controller receives a first routing request from a customer network. In some cases, the SDN controller is at least one of an MSDC or a PNC. The first routing request includes a destination address for a VN and a first QoS indicator associated with a first service of the VN. At 804, the SDN controller determines a first VN route in a provider network based on the first QoS indicator and the destination address. In some cases, the provider network is a Multiprotocol Label Switching (MPLS) network and the first VN route is a Label Switched Path (LSP). At 806, the SDN controller associates a first VN label with the first VN route. At 808, the SDN controller transmits a first routing response to the customer network. The first routing response includes the first VN label. At 810, the SDN controller transmits the first VN label and first routing information to an edge router of the provider network. The first routing information indicates the first VN route. In some cases, the first VN label and the first routing information are transmitted using a Path Computation Elements Protocol (PCEP) message. In some cases, the first routing information includes a forwarding rule object indicating the first VN route.

In some implementations, at 812, the SDN controller receives a second routing request from the customer network. The second routing request includes the destination address for the VN and a second QoS indicator associated with a second service of the VN. The second QoS indicator indicates a different QoS policy than the first QoS indicator. At 814, the SDN controller determines a second VN route in a provider network based on the first QoS indicator and the destination address. The second VN route is different than the first VN route. At 816, the SDN controller associates a second VN label with the second VN route. At 818, the SDN controller transmits a second routing response to the customer network. The second routing response includes the second VN label. At 820, the SDN controller transmits the second VN label and second routing information to the edge router of the provider network. The second routing information indicates the second VN route.

In some implementations, at 822, the SDN controller determines that a traffic condition in the provider network has changed. At 824, in response to determining that the traffic condition in the provider network has changed, the SDN controller determines a third VN route based on the first QoS indicator and the traffic condition. At 826, the SDN controller transmits the first VN label and third routing information to the edge router of the provider network. The third routing information indicates the third VN route.

Figure 9:
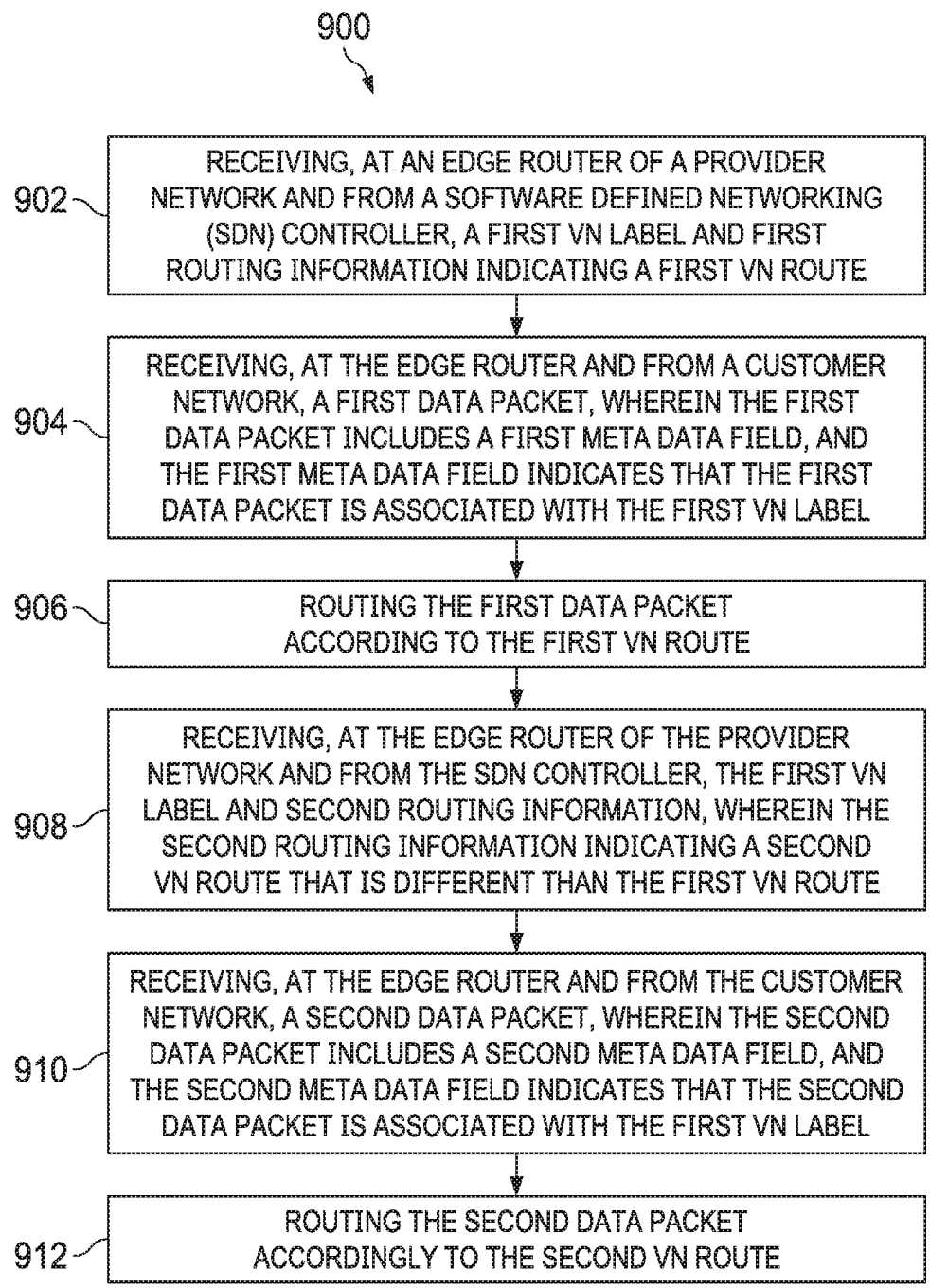
FIG. 9 is a flowchart illustrating an example method for routing data packets, according to different VN routes, according to an implementation.

FIG. 9 is a flowchart illustrating an example method 900 for routing data packets according to different VN routes, according to an implementation. The method 900 can be implemented by an edge router in a provider network, e.g., the provider ER 134 shown in FIGS. 1 and 2. The method 900 can also be implemented using additional, fewer, or different entities. Furthermore, the method 900 can also be implemented using additional, fewer, or different operations, which can be performed in the order shown or in a different order. In some instances, an operation or a group of operations can be iterated or repeated, for example, for a specified number of iterations or until a terminating condition is reached.

The example method 900 begins at 902, where an edge router of a provider network recieves a first VN label and first routing information from a SDN controller. The first routing information indicates a first VN route. At 904, the edge router receives a first data packet from a customer network. The first data packet includes a first meta data field. The first meta data field indicates that the first data packet is associated with the first VN label. At 906, the edge router routes the first data packet according to the first VN route. In some implementations, the first meta data field is an NSH. In some implementations, routing the first data packet includes modifying the first data packet by removing the first meta data field and adding a multiprotocol label switching (MPLS) header, and routing the modified first data packet. The MPLS header indicates the first VN route. In some implementations, the first VN label and the first routing information are received in a Path Computation Elements Protocol (PCEP) message. In some implementations, the first routing information comprises a forwarding rule object indicating the first VN route. In some implementations, the SDN controller is at least one of an MSDC or a PNC.

In some implementations, at 908, the edge router recieves a first VN label and second routing information from the SDN controller. The second routing information indicates a second VN route that is different than the first VN route. At 910, the edge router receives a second data packet from a customer network. The second data packet includes a second meta data field. The second meta data field indicates that the second data packet is associated with the first VN label. At 912, the edge router routes the second data packet according to the second VN route.

Figure 10:
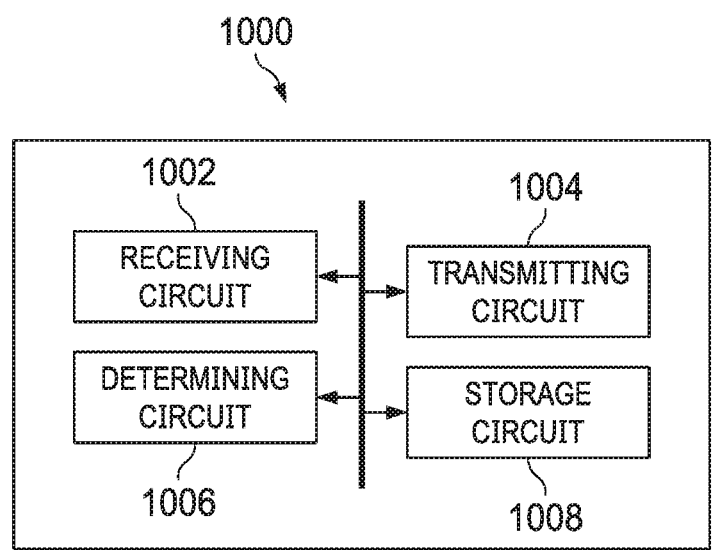
FIG. 10 is a schematic diagram illustrating an example structure of a Software Defined Networking (SDN) controller described in the present disclosure, according to an implementation.

FIG. 10 is a schematic diagram illustrating an example structure of an SDN controller 1000 described in the present disclosure, according to an implementation. The SDN controller 1000 includes a receiving circuit 1002, a transmitting circuit 1004, a determining circuit 1006, and a storage circuit 1008. The determining circuit 1006 can be coupled to or capable of communicating with the receiving circuit 1002, the transmitting circuit 1004, and the storage circuit 1008. In some implementations, the SDN controller 1000 can further include one or more circuits for performing any one or a combination of steps described in the present disclosure.

The receiving circuit 1002 is configured to receive, from a customer network, a first routing request. The first routing request includes a destination address for a VN and a first quality of service (QoS) indicator associated with a first service of the VN.

The determining circuit 1006 is configured to determine a first VN route in a provider network based on the first QoS indicator and the destination address.

The storage circuit 1008 is configured to associatively store the first VN label with the first VN route.

The transmitting circuit 1004 is configured to transmit, to the customer network, the first VN label and first routing information indicating the first VN route. The transmitting circuit 1004 is also configured to transmit, to an edge router of the provider network, the first VN label and first routing information indicating the first VN route.

Figure 11:
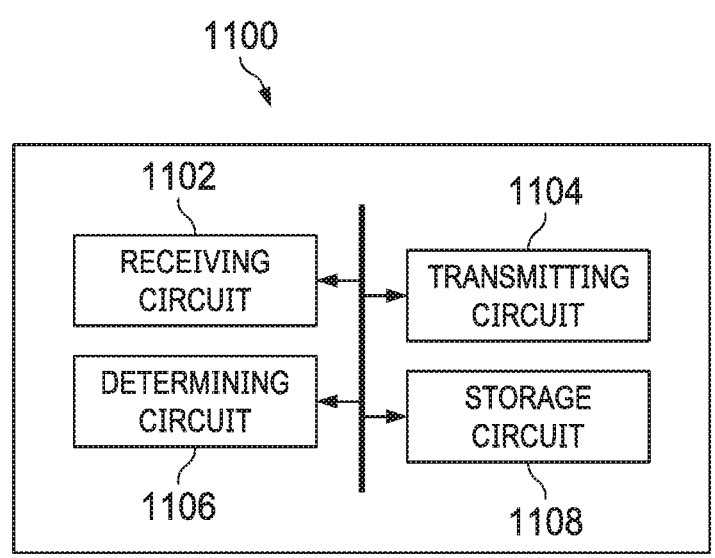
FIG. 11 is a schematic diagram illustrating an example structure of an edge router of a provider network described in the present disclosure, according to an implementation.

FIG. 11 is a schematic diagram illustrating an example structure of an edge router 1100 of a provider network described in the present disclosure, according to an implementation. The edge router 1100 includes a receiving circuit 1102, a transmitting circuit 1104, a determining circuit 1106, and a storage circuit 1108. The determining circuit 1106 can be coupled to or capable of communicating with the receiving circuit 1102, the transmitting circuit 1104, and the storage circuit 1108. In some implementations, the edge router 1100 can further include one or more circuits for performing any one or combination of steps described in the present disclosure.

The receiving circuit 1102 is configured to receive, from an SDN controller, a first VN label and first routing information indicating a first VN route.

The storage circuit 1108 is configured to associatively store the first VN label with the first VN route.

The receiving circuit 1102 is further configured to receive, from a customer network, a first data packet. The first data packet includes a first meta data field, and the first meta data field indicates that the first data packet is associated with the first VN label.

The determining circuit 1106 is configured to determine that the first data packet is associated with the first VN label based on the first meta data field.

The transmitting circuit 1104 is configured to route the first data packet according to the first VN route.

Described implementations of the subject matter can include one or more features, alone or in combination.

In a first implementation, a computer-implemented method for establishing virtual network (VN) routes includes: receiving, at a Software Defined Networking (SDN) controller and from a customer network, a first routing request, wherein the first routing request includes a destination address for a VN and a first Quality of Service (QoS) indicator associated with a first service of the VN; determining, by the SDN controller, a first VN route in a provider network based on the first QoS indicator and the destination address; associating, by the SDN controller, a first VN label with the first VN route; transmitting, from the SDN controller to the customer network, a first routing response, wherein the first routing response includes the first VN label; and transmitting, from the SDN controller to an edge router of the provider network, the first VN label and first routing information indicating the first VN route.

The foregoing and other described implementations can each, optionally, include one or more of the following features:

A first feature, combinable with any of the following features, where the method further includes: receiving, at the SDN controller and from the customer network, a second routing request, wherein the second routing request includes the destination address for the VN and a second QoS indicator associated with a second service of the VN, wherein the second QoS indicator indicates a different QoS policy than the first QoS indicator; determining, by the SDN controller, a second VN route in the provider network based on the second QoS indicator and the destination address, wherein the second VN route is different than the first VN route; associating, by the SDN controller, a second VN label with the second VN route; transmitting, from the SDN controller to the customer network, a second routing response, wherein the second routing response includes the second VN label; and transmitting, from the SDN controller to the edge router of the provider network, the second VN label and second routing information indicating the second VN route.

A second feature, combinable with any of the previous or following features, where the method further includes determining, by the SDN controller, that a traffic condition in the provider network has changed; in response to determining that the traffic condition in the provider network has changed, determining, by the SDN controller, a third VN route based on the first QoS indicator and the traffic condition; and transmitting, from the SDN controller to the edge router of the provider network, the first VN label and third routing information indicating the third VN route.

A third feature, combinable with any of the previous or following features, where the first VN label and the first routing information are transmitted using a Path Computation Elements Protocol (PCEP) message.

A fourth feature, combinable with any of the previous or following features, where the first routing information comprises a forwarding rule object indicating the first VN route.

A fifth feature, combinable with any of the previous or following features, where the SDN controller comprises at least one of a Multi-Domain Service Coordinator (MSDC) or a Provisioning Network Controller (PNC).

A sixth feature, combinable with any of the previous features, where the provider network is a Multiprotocol Label Switching (MPLS) network and the first VN route is a Label Switched Path (LSP).

In a second implementation, a computer-implemented method for routing data packets according to different virtual network (VN) routes includes: receiving, at an edge router of a provider network and from a Software Defined Networking (SDN) controller, a first VN label and first routing information indicating a first VN route; receiving, at the edge router and from a customer network, a first data packet, wherein the first data packet includes a first meta data field, and the first meta data field indicates that the first data packet is associated with the first VN label; and routing the first data packet according to the first VN route.

The foregoing and other described implementations can each, optionally, include one or more of the following features:

A first feature, combinable with any of the following features, where the method further includes: receiving, at the edge router of the provider network and from the SDN controller, the first VN label and second routing information, wherein the second routing information indicating a second VN route that is different than the first VN route; receiving, at the edge router and from the customer network, a second data packet, wherein the second data packet includes a second meta data field, and the second meta data field indicates that the second data packet is associated with the first VN label; and routing the second data packet accordingly to the second VN route.

A second feature, combinable with any of the previous or following features, where the first meta data field is a Network Service Header (NSH).

A third feature, combinable with any of the previous or following features, where routing the first data packet comprises: modifying the first data packet by removing the first meta data field and adding a Multiprotocol Label Switching (MPLS) header, wherein the MPLS header indicates the first VN route; and routing the modified first data packet.

A fourth feature, combinable with any of the previous or following features, where the first VN label and the first routing information are received in a Path Computation Elements Protocol (PCEP) message.

A fifth feature, combinable with any of the previous or following features, where the first routing information comprises a forwarding rule object indicating the first VN route.

A sixth feature, combinable with any of the previous features, where the SDN controller is at least one of a Multi-Domain Service Coordinator (MSDC) or a Provisioning Network Controller (PNC).

In a third implementation, a Software Defined Networking (SDN) controller includes: a non-transitory memory storage comprising instructions; and one or more hardware processors in communication with the memory storage, wherein the one or more hardware processors execute the instructions to: receive, from a customer network, a first routing request, wherein the first routing request includes a destination address for a virtual network (VN) and a first Quality of Service (QoS) indicator associated with a first service of the VN; determine a first VN route in a provider network based on the first QoS indicator and the destination address; associate a first VN label with the first VN route; transmit, to the customer network, a first routing response, wherein the first routing response includes the first VN label; and transmit, from the SDN controller to an edge router of the provider network, the first VN label and first routing information indicating the first VN route.

The foregoing and other described implementations can each, optionally, include one or more of the following features:

A first feature, combinable with any of the following features, where the one or more hardware processors further execute the instructions to: receive, from the customer network, a second routing request, wherein the second routing request includes the destination address for the VN and a second QoS indicator associated with a second service of the VN, wherein the second QoS indicator indicates a different QoS policy than the first QoS indicator; determine a second VN route in the provider network based on the second QoS indicator and the destination address, wherein the second VN route is different than the first VN route; associate a second VN label with the second VN route; transmit, to the customer network, a second routing response, wherein the second routing response includes the second VN label; and transmit, to the edge router of the provider network, the second VN label and second routing information indicating the second VN route.

A second feature, combinable with the any of the previous or following features, where the one or more hardware processors further execute the instructions to: determine that a traffic condition in the provider network has changed; in response to determining that the traffic condition in the provider network has changed, determine a third VN route based on the first QoS indicator and the traffic condition; and transmit, to the edge router of the provider network, the first VN label and third routing information indicating the third VN route.

A third feature, combinable with any of the previous or following features, where the first VN label and the first routing information are transmitted using a Path Computation Elements Protocol (PCEP) message.

A fourth feature, combinable with any of the previous or following features, where the first routing information comprises a forwarding rule object indicating the first VN route.

A fifth feature, combinable with any of the previous or following features, where the SDN controller comprises at least one of a Multi-Domain Service Coordinator (MSDC) or a Provisioning Network Controller (PNC).

A sixth feature, combinable with any of the previous features, where the provider network is a Multiprotocol Label Switching (MPLS) network and the first VN route is a Label Switched Path (LSP).

In a fourth implementation, a non-transitory computer-readable medium storing computer instructions for processing a data packet in a communication network, that when executed by one or more hardware processors, cause the one or more hardware processors of a router to perform operations including: receiving, at a Software Defined Networking (SDN) controller and from a customer network, a first routing request, wherein the first routing request includes a destination address for a VN and a first Quality of Service (QoS) indicator associated with a first service of the VN; determining, by the SDN controller, a first VN route in a provider network based on the first QoS indicator and the destination address; associating, by the SDN controller, a first VN label with the first VN route; transmitting, from the SDN controller to the customer network, a first routing response, wherein the first routing response includes the first VN label; and transmitting, from the SDN controller to an edge router of the provider network, the first VN label and first routing information indicating the first VN route.

The foregoing and other described implementations can each, optionally, include one or more of the following features:

A first feature, combinable with any of the following features, where the operations further include: receiving, at the SDN controller and from the customer network, a second routing request, wherein the second routing request includes the destination address for the VN and a second QoS indicator associated with a second service of the VN, wherein the second QoS indicator indicates a different QoS policy than the first QoS indicator; determining, by the SDN controller, a second VN route in the provider network based on the second QoS indicator and the destination address, wherein the second VN route is different than the first VN route; associating, by the SDN controller, a second VN label with the second VN route; transmitting, from the SDN controller to the customer network, a second routing response, wherein the second routing response includes the second VN label; and transmitting, from the SDN controller to the edge router of the provider network, the second VN label and second routing information indicating the second VN route.

A second feature, combinable with any of the previous or following features, where the operations further include determining, by the SDN controller, that a traffic condition in the provider network has changed; in response to determining that the traffic condition in the provider network has changed, determining, by the SDN controller, a third VN route based on the first QoS indicator and the traffic condition; and transmitting, from the SDN controller to the edge router of the provider network, the first VN label and third routing information indicating the third VN route.

A third feature, combinable with any of the previous or following features, where the first VN label and the first routing information are transmitted using a Path Computation Elements Protocol (PCEP) message.

A fourth feature, combinable with any of the previous or following features, where the first routing information comprises a forwarding rule object indicating the first VN route.

A fifth feature, combinable with any of the previous or following features, where the SDN controller comprises at least one of a Multi-Domain Service Coordinator (MSDC) or a Provisioning Network Controller (PNC).

A sixth feature, combinable with any of the previous features, where the provider network is a Multiprotocol Label Switching (MPLS) network and the first VN route is a Label Switched Path (LSP).

In a fifth implementation, an edge router includes: a non-transitory memory storage comprising instructions; and one or more hardware processors in communication with the memory storage, wherein the one or more hardware processors execute the instructions to: receive, at the edge router of a provider network and from a Software Defined Networking (SDN) controller, a first VN label and first routing information indicating a first VN route; receive, at the edge router and from a customer network, a first data packet, wherein the first data packet includes a first meta data field, and the first meta data field indicates that the first data packet is associated with the first VN label; and route the first data packet according to the first VN route.

The foregoing and other described implementations can each, optionally, include one or more of the following features:

A first feature, combinable with any of the following features, where the one or more hardware processors further execute the instructions to: receive, at the edge router of the provider network and from the SDN controller, the first VN label and second routing information, wherein the second routing information indicating a second VN route that is different than the first VN route; receive, at the edge router and from the customer network, a second data packet, wherein the second data packet includes a second meta data field, and the second meta data field indicates that the second data packet is associated with the first VN label; and route the second data packet accordingly to the second VN route.

A second feature, combinable with any of the previous or following features, where the first meta data field is a Network Service Header (NSH).

A third feature, combinable with any of the previous or following features, where routing the first data packet comprises: modifying the first data packet by removing the first meta data field and adding a Multiprotocol Label Switching (MPLS) header, wherein the MPLS header indicates the first VN route; and routing the modified first data packet.

A fourth feature, combinable with any of the previous or following features, where the first VN label and the first routing information are received in a Path Computation Elements Protocol (PCEP) message.

A fifth feature, combinable with any of the previous or following features, where the first routing information comprises a forwarding rule object indicating the first VN route.

A sixth feature, combinable with any of the previous features, where the SDN controller is at least one of a Multi-Domain Service Coordinator (MSDC) or a Provisioning Network Controller (PNC).

In a sixth implementation, a non-transitory computer-readable medium storing computer instructions for processing a data packet in a communication network, that when executed by one or more hardware processors, cause the one or more hardware processors of a router to perform operations including: receiving, at an edge router of a provider network and from a Software Defined Networking (SDN) controller, a first VN label and first routing information indicating a first VN route; receiving, at the edge router and from a customer network, a first data packet, wherein the first data packet includes a first meta data field, and the first meta data field indicates that the first data packet is associated with the first VN label; and routing the first data packet according to the first VN route.

The foregoing and other described implementations can each, optionally, include one or more of the following features:

A first feature, combinable with any of the following features, where the operations further include: receiving, at the edge router of the provider network and from the SDN controller, the first VN label and second routing information, wherein the second routing information indicating a second VN route that is different than the first VN route; receiving, at the edge router and from the customer network, a second data packet, wherein the second data packet includes a second meta data field, and the second meta data field indicates that the second data packet is associated with the first VN label; and routing the second data packet accordingly to the second VN route.

A second feature, combinable with any of the previous or following features, where the first meta data field is a Network Service Header (NSH).

A third feature, combinable with any of the previous or following features, where routing the first data packet comprises: modifying the first data packet by removing the first meta data field and adding a Multiprotocol Label Switching (MPLS) header, wherein the MPLS header indicates the first VN route; and routing the modified first data packet.

A fourth feature, combinable with any of the previous or following features, where the first VN label and the first routing information are received in a Path Computation Elements Protocol (PCEP) message.

A fifth feature, combinable with any of the previous or following features, where the first routing information comprises a forwarding rule object indicating the first VN route.

A sixth feature, combinable with any of the previous features, where the SDN controller is at least one of a Multi-Domain Service Coordinator (MSDC) or a Provisioning Network Controller (PNC).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for establishing virtual network (VN) routes, comprising:
   receiving, at a Software Defined Networking (SDN) controller and from a customer network, a first routing request, wherein the first routing request includes a destination address for a VN and a first Quality of Service (QoS) indicator associated with a first service of the VN;
   determining, by the SDN controller, a first VN route in a provider network based on the first QoS indicator and the destination address, wherein the customer network is different than the provider network;
   associating, by the SDN controller, a first VN label with the first VN route;
   transmitting, from the SDN controller to the customer network, a first routing response, wherein the first routing response includes the first VN label, and the first VPN label indicates the first VN route; and
   transmitting, from the SDN controller to an edge router of the provider network, the first VN label and first routing information indicating the first VN route.

2. The method of claim 1, further comprising:
   receiving, at the SDN controller and from the customer network, a second routing request, wherein the second routing request includes the destination address for the VN and a second QoS indicator associated with a second service of the VN, wherein the second QoS indicator indicates a different QoS policy than the first QoS indicator;
   determining, by the SDN controller, a second VN route in the provider network based on the second QoS indicator and the destination address, wherein the second VN route is different than the first VN route;
   associating, by the SDN controller, a second VN label with the second VN route;
   transmitting, from the SDN controller to the customer network, a second routing response, wherein the second routing response includes the second VN label; and
   transmitting, from the SDN controller to the edge router of the provider network, the second VN label and second routing information indicating the second VN route.

3. The method of claim 1, further comprising:
   determining, by the SDN controller, that a traffic condition in the provider network has changed;
   in response to determining that the traffic condition in the provider network has changed, determining, by the SDN controller, a third VN route based on the first QoS indicator and the traffic condition; and
   transmitting, from the SDN controller to the edge router of the provider network, the first VN label and third routing information indicating the third VN route.

4. The method of claim 1, wherein the first VN label and the first routing information are transmitted using a Path Computation Elements Protocol (PCEP) message.

5. The method of claim 4, wherein the first routing information comprises a forwarding rule object indicating the first VN route.

6. The method of claim 1, wherein the SDN controller comprises at least one of a Multi-Domain Service Coordinator (MSDC) or a Provisioning Network Controller (PNC).

7. The method of claim 1, wherein the provider network is a Multiprotocol Label Switching (MPLS) network or a Segment Routing (SR) network and the first VN route is a Label Switched Path (LSP).

8. A Software Defined Networking (SDN) controller, comprising:
   a non-transitory memory storage comprising instructions; and
   one or more hardware processors in communication with the memory storage, wherein the one or more hardware processors execute the instructions to:
      receive, from a customer network, a first routing request, wherein the first routing request includes a destination address for a virtual network (VN) and a first Quality of Service (QoS) indicator associated with a first service of the VN;

determine a first VN route in a provider network based on the first QoS indicator and the destination address, wherein the customer network is different than the provider network;

associate a first VN label with the first VN route;

transmit, to the customer network, a first routing response, wherein the first routing response includes the first VN label, and the first VPN label indicates the first VN route; and transmit, from the SDN controller to an edge router of the provider network, the first VN label and first routing information indicating the first VN route.

9. The SDN controller of claim 8, wherein the one or more hardware processors further execute the instructions to:

receive, from the customer network, a second routing request, wherein the second routing request includes the destination address for the VN and a second QoS indicator associated with a second service of the VN, wherein the second QoS indicator indicates a different QoS policy than the first QoS indicator;

determine a second VN route in the provider network based on the second QoS indicator and the destination address, wherein the second VN route is different than the first VN route;

associate a second VN label with the second VN route;

transmit, to the customer network, a second routing response, wherein the second routing response includes the second VN label; and transmit, to the edge router of the provider network, the second VN label and second routing information indicating the second VN route.

10. The SDN controller of claim 8, wherein the one or more hardware processors further execute the instructions to:

determine that a traffic condition in the provider network has changed;

in response to determining that the traffic condition in the provider network has changed, determine a third VN route based on the first QoS indicator and the traffic condition; and transmit, to the edge router of the provider network, the first VN label and third routing information indicating the third VN route.

11. The SDN controller of claim 8, wherein the first VN label and the first routing information are transmitted using a Path Computation Elements Protocol (PCEP) message.

12. The SDN controller of claim 11, wherein the first routing information comprises a forwarding rule object indicating the first VN route.

13. The SDN controller of claim 8, wherein the SDN controller comprises at least one of a Multi-Domain Service Coordinator (MSDC) or a Provisioning Network Controller (PNC).

14. A non-transitory computer-readable medium storing computer instructions for processing a data packet in a communication network, that when executed by one or more hardware processors, cause the one or more hardware processors of a router to perform operations comprising:

receiving, at a Software Defined Networking (SDN) controller and from a customer network, a first routing request, wherein the first routing request includes a destination address for a VN and a first Quality of Service (QoS) indicator associated with a first service of the VN;

determining, by the SDN controller, a first VN route in a provider network based on the first QoS indicator and the destination address, wherein the customer network is different than the provider network;

associating, by the SDN controller, a first VN label with the first VN route;

transmitting, from the SDN controller to the customer network, a first routing response, wherein the first routing response includes the first VN label, and the first VPN label indicates the first VN route; and transmitting, from the SDN controller to an edge router of the provider network, the first VN label and first routing information indicating the first VN route.

15. The non-transitory computer-readable medium of claim 14, the operations further comprising:

receiving, at the SDN controller and from the customer network, a second routing request, wherein the second routing request includes the destination address for the VN and a second QoS indicator associated with a second service of the VN, wherein the second QoS indicator indicates a different QoS policy than the first QoS indicator;

determining, by the SDN controller, a second VN route in the provider network based on the second QoS indicator and the destination address, wherein the second VN route is different than the first VN route;

associating, by the SDN controller, a second VN label with the second VN route;

transmitting, from the SDN controller to the customer network, a second routing response, wherein the second routing response includes the second VN label; and transmitting, from the SDN controller to the edge router of the provider network, the second VN label and second routing information indicating the second VN route.

16. The non-transitory computer-readable medium of claim 14, the operations further comprising:

determining, by the SDN controller, that a traffic condition in the provider network has changed;

in response to determining that the traffic condition in the provider network has changed, determining, by the SDN controller, a third VN route based on the first QoS indicator and the traffic condition; and transmitting, from the SDN controller to the edge router of the provider network, the first VN label and third routing information indicating the third VN route.

17. The non-transitory computer-readable medium of claim 14, wherein the first VN label and the first routing information are transmitted using a Path Computation Elements Protocol (PCEP) message.

18. The non-transitory computer-readable medium of claim 17, wherein the first routing information comprises a forwarding rule object indicating the first VN route.

* * * * *